United States Patent
Chin

[19]

[11] Patent Number: 5,969,638
[45] Date of Patent: Oct. 19, 1999

[54] MULTIPLE TRANSDUCER MWD SURFACE SIGNAL PROCESSING

[75] Inventor: Wilson C. Chin, Houston, Tex.

[73] Assignee: Halliburton Energy Services, Inc., Houston, Tex.

[21] Appl. No.: 09/014,188

[22] Filed: Jan. 27, 1998

[51] Int. Cl.[6] .................................................. G01V 3/00
[52] U.S. Cl. .................. 340/855.3; 340/870.15; 367/83; 166/65.1
[58] Field of Search .................. 340/853.1, 853.2, 340/855.3, 870.15, 870.16; 367/81, 83; 166/65.1

[56] References Cited

U.S. PATENT DOCUMENTS

| | | | |
|---|---|---|---|
| 3,488,629 | 1/1970 | Claycomb | 367/83 |
| 3,555,504 | 1/1971 | Fields | 367/83 |
| 3,716,830 | 2/1973 | Garcia | 367/83 |
| 3,742,443 | 6/1973 | Foster et al. | 340/18 LD |
| 3,747,059 | 7/1973 | Garcia | 367/83 |
| 4,590,593 | 5/1986 | Rodney | 367/83 |
| 4,715,022 | 12/1987 | Yeo | 367/83 |
| 5,515,336 | 5/1996 | Chin et al. | 367/83 |

*Primary Examiner*—Michael Horabik
*Assistant Examiner*—Timothy Edwards, Jr.
*Attorney, Agent, or Firm*—Conley, Rose & Tayon

[57] ABSTRACT

A system and method for signal processing are disclosed. One problem in measurement-while-drilling systems including a downhole acoustic transmitter is the presence of uphole generated noise and reflected signals. By proper spacing and timing of multiple transducers and measurements, the present invention filters from the received, corrupted signal the uphole noise and reflected signals. Thus, a more accurate depiction of the transmitted signal is generated uphole.

27 Claims, 3 Drawing Sheets

MULTIPLE TRANSDUCER MWD SURFACE SIGNAL PROCESSING

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to measurement-while-drilling systems. More particularly, the present invention relates to downhole data transmission in a measurement-while-drilling system. Most particularly, the present invention relates to a method and apparatus for processing noise and reflections from a surface-received waveform to yield a more accurate depiction of a signal transmitted from downhole.

2. Description of the Related Art

Modern petroleum drilling and production operations demand a great quantity of information relating to parameters and conditions downhole. Such information typically includes characteristics of the earth formations traversed by the wellbore, in addition to data relating to the size and configuration of the borehole itself. The collection of information relating to conditions downhole commonly is referred to as "logging." Logging has been known in the industry for many years as a technique for providing information regarding the particular earth formation being drilled and can be performed by several methods. In conventional oil well wireline logging, a probe or "sonde" is lowered into the borehole after some or all of the well has been drilled, and is used to determine certain characteristics of the formations traversed by the borehole. A wireline sonde may include a source device for transmitting energy into the formation, and one or more receivers for detecting the energy reflected from the formation. Various sensors have been used to determine particular characteristics of the formation, including nuclear sensors, acoustic sensors, and electrical sensors. The sonde typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface and to control signals from the surface to the sonde. In accordance with conventional techniques, various parameters of the earth's formations are measured and correlated with the position of the sonde in the borehole, as the sonde is pulled uphole.

While wireline logging is useful in assimilating information relating to formations downhole, it nonetheless has certain disadvantages. For example, before the wireline logging tool can be run in the wellbore, the drillstring and bottomhole assembly must first be removed, or tripped, from the borehole, resulting in considerable cost and loss of drilling time for the driller (who typically is paying daily fees for the rental of drilling equipment). In addition, because wireline tools are unable to collect data during the actual drilling operation, drillers possibly must make decisions (such as the direction to drill, etc.) without sufficient information, or else incur the cost of tripping the drillstring to run a logging tool to gather more information relating to conditions downhole. In addition, because wireline logging occurs a relatively long period after the wellbore is drilled, the accuracy of the wireline measurement can be questionable. As one skilled in the art will understand, wellbore conditions tend to degrade as drilling fluids invade the formation in the vicinity of the wellbore. In addition, the borehole shape may begin to degrade, reducing the accuracy of the measurements.

Because of these limitations associated with wireline logging, there recently has been an increasing emphasis on the collection of data during the drilling process itself. By collecting and processing data during the drilling process, without the necessity of tripping the drilling assembly to insert a wireline logging tool, the driller can make accurate modifications or corrections "real-time", as necessary, to optimize drilling performance. For example, the driller may change the weight-on-bit to cause the bottomhole assembly to tend to drill in a particular direction. Moreover, the measurement of formation parameters during drilling, and hopefully before invasion of the formation, increases the usefulness of the measured data. Further, making formation and borehole measurements during drilling can save the additional rig time which otherwise would be required to run a wireline logging tool.

Techniques for measuring conditions downhole, and the movement and location of the drilling assembly contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used with the understanding that the term encompasses both the collection of formation parameters and the collection of information relating to the position of the drilling assembly while the bottomhole assembly is in the well. The measurement of formation properties during drilling of the well by LWD systems improves the timeliness of measurement data and, consequently, increases the efficiency of drilling operations. Typically, LWD measurements are used to provide information regarding the particular formation in which the borehole is traversing.

Referring to FIG. 1, there is illustrated an LWD system. A well bore or borehole 100 contains a drill string or drill pipe 110 including a hollow center region 111, and defines an annulus 130 (the region between the outside of the drill string and periphery of the borehole). Also shown are stand pipe 115 including an area of curvature 112, drill bit 125, and transmitter 140. Stand pipe 115 connects above the earth's surface (or rig floor) 117 to desurger 160, pressure transducer 150, signal processor 155 through a transmission line 158 and transducer 150, a mud pump 120, and drill string 110. Desurger 160 contains a high pressure area 162 and a rubber interface 164. Drill bit 125 attaches to drill string 110 at the lower end of the drill string. Transmitter 140, part of a bottom hole assembly (not shown in its entirety), is located near the bottom 111 of the drillstring, proximate to drill bit 125.

Typically, a pit at the surface of the earth (not shown) contains drilling fluid or mud 122. Mud pump 120 forces the drilling fluid 122 into region 111 of the drill string, where it flows in a downward direction as indicated by arrow 124. Eventually, it exits the drill string via ports in the drill bit 125 and circulates upward via annulus 130, as indicated by flow arrows 126. The drilling fluid thereby lubricates the bit and carries formation cuttings to the surface of the earth. The drilling fluid is returned to the pit for re-circulation.

Acoustic transmitter 140 generates an information signal 170 representative of measured downhole parameters. Information signal 170 typically is an acoustic pulse signal that travels in an upward direction 175 along the mud column (inside region 111) at the speed of sound. One suitable type of acoustic transmitter employs a device known as a "mud siren" which includes a slotted stator and a slotted rotor that rotates and repeatedly interrupts the flow of drilling fluid to establish a desired acoustic wave signal in the drilling fluid. Such a mud siren conventionally operates at carrier frequencies ranging from 12 Hz to 24 Hz, with data transmission rates ranging from 3 bits per second (bps) to 6 bps. Other acoustic transmitters are also known. These alternate transmitters have lower data transmission rates around 1 bps and frequency spectrum in the range of mud pump noise, so that signals are more difficult to recover at transducer 150. Driving electronics (not shown) in the bottom hole assembly include a suitable modulator such as a phase shift key (PSK) modulator, a frequency shift key modulator (FSK), or an amplitude modulator (AM), each of which conventionally produces driving signals for application to transmitter 140. Pressure transducer 150 receives the acoustic mud wave 170 at an uphole location, such as at the surface of the earth. Pressure transducer 150, which is, for example, a piezoelectric transducer, converts the received acoustic signals to electronic signals. Transducer 150 outputs the received waveform to signal processor 155 via the transmission line 158. Signal processor 155 operates to process and demodulate the received signals.

The presence of extraneous signals and noise along the mud column complicates the interpretation by signal processor 155 of an acoustic signal 170 received at pressure transducer 150. For example, the noise generated by the drilling assembly, the flow of mud through the drillstring, the grinding of the drilling components, and other mechanical and environmental noises make it difficult for the pressure transducer 150 to receive the transmitted acoustic wave 170 and to isolate the data contained in the acoustic waveform from extraneous noise. In particular, the operation of the mud pump 120, and specifically the action of its pistons (not shown), generates significant acoustic noise.

In addition to noise, reflection of acoustic signals is a significant problem. Upon the generation of an acoustic signal 170 by transmitter 140, the acoustic signal travels upward 175 toward and past pressure transducer 150. This acoustic signal may then reflect off mud pump 120, desurger 160, or both. The reflected signals rebound and travel in the opposite direction, namely downward 124 back towards the acoustic transmitter 140. As such, it is particularly difficult for the pressure transducer 150 to distinguish whether a received wave form is an upcoming waveform, a downgoing waveform, or a combination waveform. Indeed, if pressure transducer 150 is located at a node where the upcoming and downgoing signals cancel, pressure transducer 150 will erroneously indicate that no signal has been sent by downhole transmitter 140. Even if pressure transducer 150 is not located at such a node, the presence of the reflected, downgoing acoustic signals from the mud pump and desurger complicate analysis of the received waveform. These effects are in addition to the noise created by the mid pump's pistons.

Mud pump 120 acts as a solid reflector to the acoustic signal 170. As such, upon arrival at the mud pump 120, signals from transmitter 140 are reflected back in the opposite direction. These reflected signals maintain approximately the same amplitude and frequency of the original signals 170, but normally have different phases. Although there is not any appreciable difference for the range of transmission speeds currently available, at low frequencies, these reflected signals attenuate more slowly, and so the mud pump reflection phenomenon is more significant. As such, present transmission frequencies all are "low" enough that this is a significant effect. The exact nature of the signal reflected off a mud pump is difficult to predict for a myriad of reasons. For example, there are a variety of different mud pump manufacturers, and mud pump seals may be in different states of wear from mud pump to mud pump.

Desurger 160 includes a high pressure area 162 and a rubber interface 164. Rubber interface 164 and high pressure area 162 combine to absorb energy from the system and thereby dampen many of the transients present in the drilling system. Such absorption of energy helps to ensure that the system becomes and stays stable. Stability in the system minimizes the chances that energy from the mud pump pistons cracks or otherwise damages the piping of the drill string 110. However, this advantageous feature of desurger 160 is mitigated by the desurger's propensity to reflect and distort acoustic waves. Acoustic signals, and particularly lower frequency acoustic signals, reflect or bounce off desurger 160. As such, the desurger reflection phenomenon is more significant at lower frequencies. The character of the signals 190 reflected from desurger 160 is generally more complex than the character of the mud pump signal reflection 180. A signal 190 reflected from desurger 160 not only has an altered phase when compared to the transmitted signal 170, but also may have a significantly different amplitude and frequency distributions. Once again, the exact nature of the reflected waveform 190 is difficult to predict.

Therefore, pump noise and reflected signals often corrupt the signal 170 received by transducer 150. Signal corruption degrades the signal-to-noise ratio of the waveform received by transducer 150. As is well known, a lower signal-to-noise ratio decreases the reliability of the received waveform, and thus limits the data transmission rate. Conversely, a higher signal-to-noise ratio increases the reliability of the received waveform and allows an increased data transmission speed.

As such, an invention is needed to eliminate much of the noise and the reflected signals from the mud stream so that transducer 150 may better retrieve the data encoded signal 170 from the mud stream. Ideally, such an invention would not depend on knowledge of the waveform corresponding to the noise and reflected signals. Preferably, such an invention could be installed at the surface, where the acoustic signals are normally received, so as not to complicate the downhole assembly. In addition, such a solution preferably could be integrated into a known MWD system, so as to minimize costs.

SUMMARY OF THE INVENTION

The present invention features a signal processor for use with a plurality of transducers or signal "receivers," at least two of these signal receivers being spaced apart at a preferred distance of five to fifteen percent of a typical wavelength. Each signal receiver takes timewise measurements of a data wave form transmitted from the MWD transmitter downhole. In addition to data, the data waveform may include noise and signal reflections. To eliminate noise and reflections from the received data wave form, the signal processor combines measurements taken from the plurality of signal receivers, these measurements preferably being timed apart by five to fifteen percent of the wave period corresponding to a typical wave length.

More particularly, the present invention is a signal processing system for use with MWD systems, including the above-described processor. Also included in the signal processing system is a drill string for placement in a borehole, a downhole transmitter capable of generating a data signal, and a plurality of signal receivers, preferably spaced apart as indicated above. The transmission medium carrying the data signal may be, for example, the column of drilling fluid in the drill string or the piping of the drill string and stand pipe. The signal receivers may be transducers. Based upon measurements taken by the signal receivers, the signal processor retrieves the upcoming data signal generated by the transmitter, and discards noise and reflected signals travelling in a downhole direction. To minimize the number of taps in the drill string (stand pipe), the transducers may be placed in a bypass loop or unreeling coil.

Alternatively, the present invention may be viewed as a method, which includes providing both a transmitter and a signal source, with the transmitter generating an encoded upgoing signal and the downgoing signal source generating, for example, downgoing noise or signal reflections. A transmission path is provided between the transmitter and signal source, with multiple signal receivers being selectively arranged along the transmission path. Measurements taken by the signal receivers are used to filter out the encoded upgoing signal from the downgoing signals. Advantageously, the wave form from the signal source need not be known, and the signal receivers may be surface installed.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

During the course of the following description, the terms "upward" and "downward" are used to denote the relative position of certain components with respect to the direction of flow of the drilling mud. Thus, where a term is described as upward of another, it is intended to mean that drilling mud flows first through the first component before flowing through the second component. Thus, these and other terms are used to identify the relative position of components in the LWD system, measured along the wellbore and standpipe path.

Figure 1:
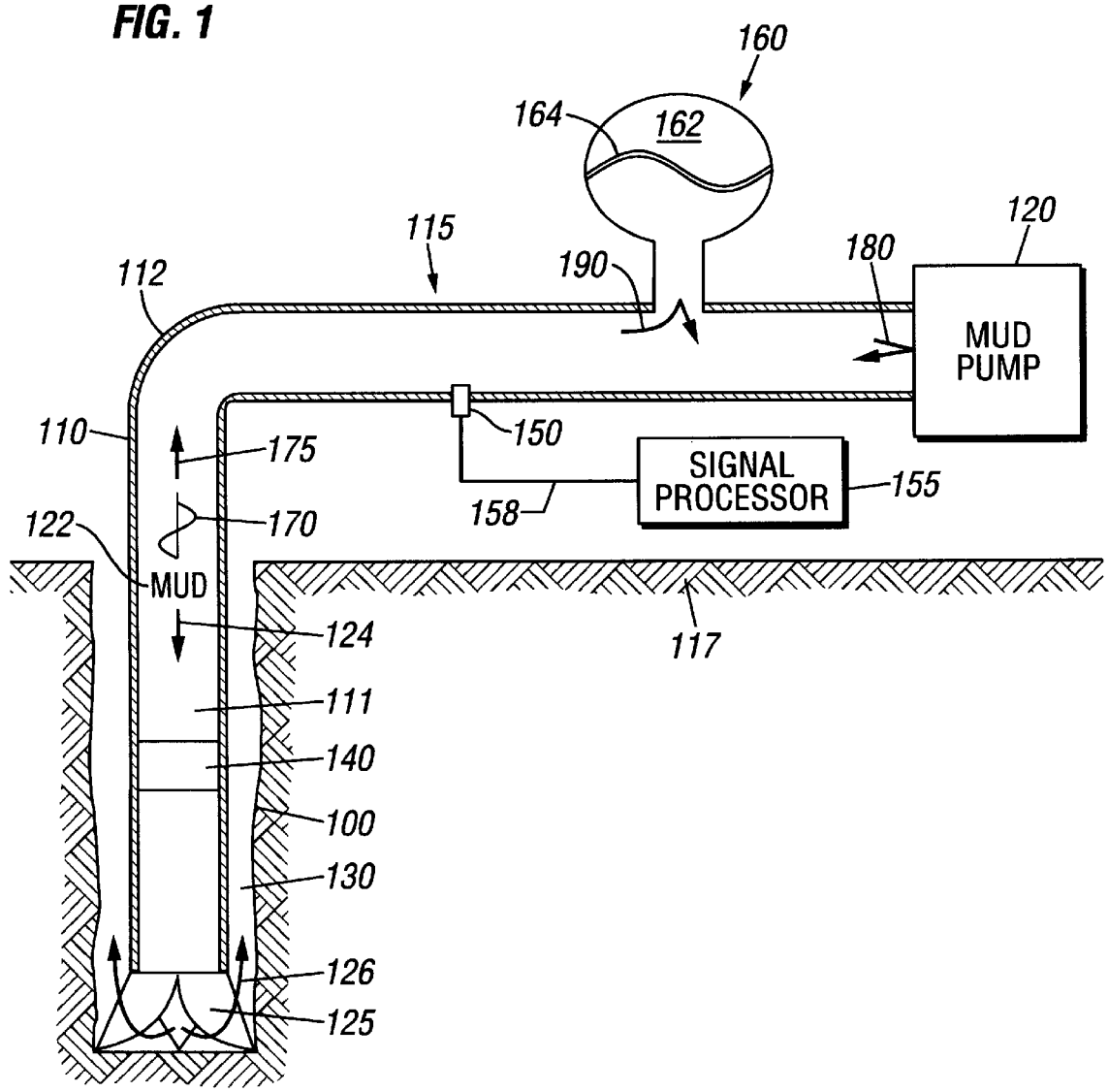
FIG. 1 is an illustration of an LWD drilling system.
Figure 6:
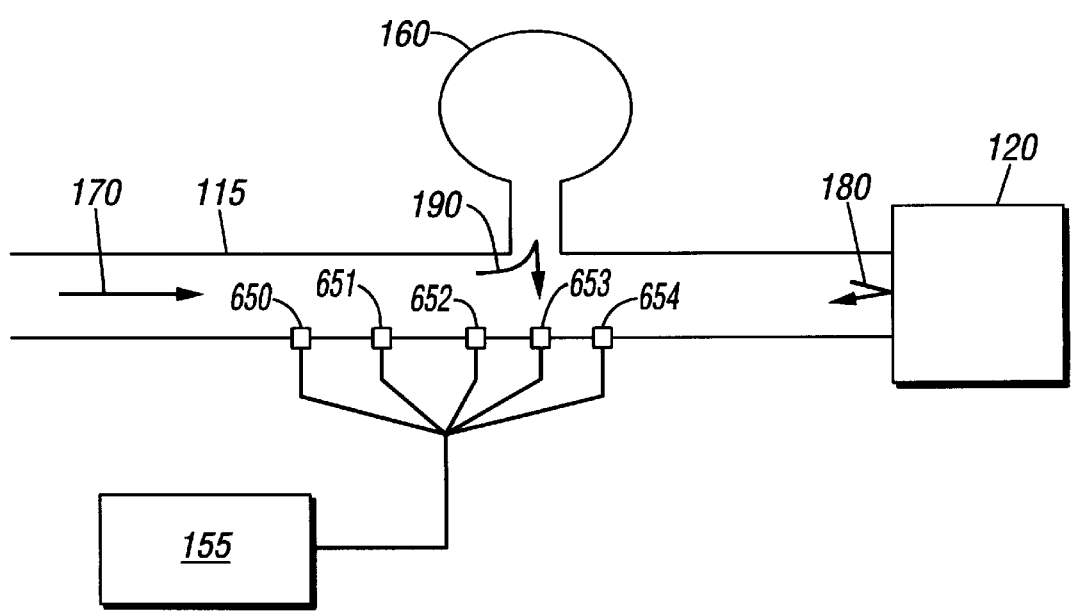
FIG. 6 shows a third embodiment of the present invention.

Referring now to FIG. 6, a measurement while drilling system built in accordance with the present invention is shown, with elements found in FIG. 1 labeled correspondingly. The present invention requires at least two transducers. An array of transducers 650, 651, 652, 653, 654 is shown, and detects an encoded acoustic signal 170 sent from downhole and travelling upward from left to right. Proper spacing of these transducers, combined with the measurement of data at selected times, allows improved retrieval of the data contained in acoustic signal 170. The present invention filters reflected signals 180, 190 from the transmitted signal 170, and filters out noise created by the mud pump pistons. The present invention is particularly robust because no information about the pump noise characteristics, the reflective characteristics of the mud pump, or the reflective-distortive characteristics of the desurger is necessary. Although the receivers 650–654 are shown in FIG. 6 as being located colinear with desurger 160, this is not required; receivers may be installed in different azimuthal positions about the pipe. Indeed, beyond multiple receivers and measurements, only the speed of sound through mud is required.

Appropriate spacing of transducers and timing of measurements may be determined as follows. The boundary and initial value problem that governs wave propagation in a one-dimensional system is:

$$p_{tt} - c^2 p_{xx} = 0$$

where subscripts denote partial derivatives, t is time, x is distance, p(x,t) is the space-time-dependent acoustic pressure, and c is the speed of sound in mud.

In general, the acoustic pressure in a drill pipe, p(x,t), may be expressed as the sum of an upgoing wave, g, and a downgoing wave, f. That is, $$p(x,t) = g(x-ct) + f(x+ct) \tag{1}$$

According to this nomenclature and the placement of acoustic signal receivers 650–654 above transmitter 140, the downhole information transmitted by a transmitter 140 is contained in the upgoing wave, g(x−ct). Reflected signals and piston noise are contained in the downgoing wave, f(x+ct). It is, therefore, desirable to isolate g(x−ct) from the combined field p(x,t). Taking the space and time derivatives of equation (1) and using the chain rule yields:

$$g' + f' = p_x \tag{2}$$

$$-cg' + cf' = p_t \tag{3}$$

where g is the derivative of g(x−ct), and f is the derivative of f(x+ct).

Solving equations (2) and (3) for g' yields:

$$g' = \frac{cp_x - p_t}{2c} \tag{4}$$

Equation (4) gives the relationship needed to manipulate pressure readings taken from different transducers at different times, and has the effect of capturing only the upcoming wave and discarding mud pump noise and the downgoing reflected waves. Note that there is no need to integrate g' to obtain g(x−ct), because the derivative g' contains the same phase, amplitude, and frequency information.

Similarly, in the event that the downward travelling waveform is desired, $$f' = \frac{cp_x + p_t}{2c} \quad (5)$$

Equation (5) can be used if multiple receivers are placed below the transmitter 140 and the retrieval of the downgoing waveform (containing encoded data) is desired. In such a circumstance, the upcoming wave would contain noise from the drill bit and acoustic waves reflected from the bottom of the drillstring. Either way, g' and f' may be obtained if $p_x$ and $p_t$ can be found, as well as c, the speed of sound in mud.

Figure 2:
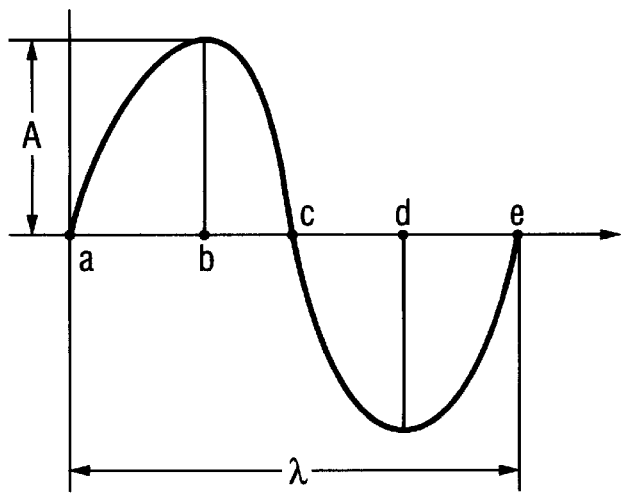
FIG. 2 is a depiction of a known waveform.
Figure 3:
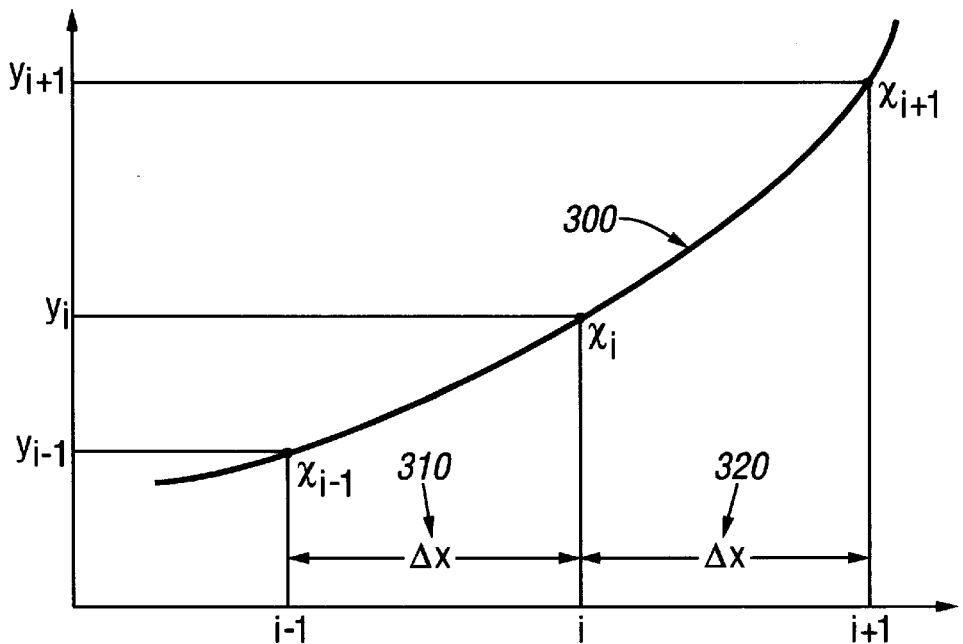
FIG. 3 is a graph showing a curve with 3 labeled points.

As is well known to those in the mathematical arts, the derivative of a line function at a particular point yields the slope of the line at that point. As such, $p_x$ and $p_t$ correspond to the slope of some line. Referring now to FIG. 2, there exists a continuous wave with frequency f, wave length λ, and amplitude A (f and λ being related by an inverse relationship such that λ=c/f). If the slope at a particular point on this wave is desired, those skilled in the field of finite differences are aware of a variety of different methods to approximate the slope of a line at a particular point. For example, and referring to the graph shown in FIG. 3, a line 300, a first point $x_{i-1}$, a second point $x_i$, and a third point $x_{i+1}$ are shown. Each of these points corresponds to a pair of locations on the axes, labeled $y_{i-1}$, $y_i$, $y_{i+1}$, i−1, i, and i+1. Also shown are lateral distances Δx 310 and Δx 320. Although Δx 310 and Δx 320 are shown as being equal, other slope approximations known to those skilled in the art allow these distances 310, 320 to be different. The slope at the point $x_i$ may variously be expressed as $$\frac{y_i - y_{i-1}}{\Delta x} \quad (6)$$

$$\frac{y_{i+1} - y_i}{\Delta x} \quad (7)$$

$$\frac{y_{i+1} - y_{i-1}}{2\Delta x} \quad (8)$$

Equation (8) is second order accurate, while equations (6) and (7) are first order accurate. Additional points may be used to obtain higher order accuracy, as is well known to finite difference mathematicians of ordinary skill.

In real world application, i−1, i, and i+1 can be interpreted as a requirement for three separate pressure transducers mounted in the stand pipe (or anywhere else along the drill string above the transmitter 140), each pressure transducer separated by a Δx transducer spacing and a series of measurements in time, each measurement separated by a Δt time lag. Additional pressure transducers may be added for use for higher order accuracy. Similarly, improved time derivatives are obtained by more frequent measurements. This involves more time level storage, and hence more computer memory and processing. It is not necessary to have the same order of accuracy for both space and time derivative approximations.

The efficacy of the present invention degenerates when the pressure transducers are placed too close together or too far apart. Similarly, the timing of measurements should not be too frequent or too infrequent. As an initial matter, the transducers should not be placed too closely together because a certain amount of distance between the transmitters helps to distinguish each transducer reading. At the same time, however, Δx and Δt should be small compared to typical wave length and wave periods, respectively. This requirement flows from the nature of the slope approximation yielding $p_x$ and $p_t$. Referring back to FIG. 2, it can be seen that the slope along the wave can change significantly from quarter wave length to quarter wave length. As such, total length occupied by all pressure transducers greater than twenty-five percent (25%) of a wave length inhibits the accurate approximation of line slope. Similarly, total time span for any calculation of $p_t$ time should be less than 25% of a wave period. Preferably, spacing and time measurements should be less than twenty percent (20%) of a wave length and wave period. Even more preferably, Δx should be five to fifteen percent (5–15%) of a wave length and Δt should be 5–15% of a wave period.

Referring now to FIG. 1, care must be taken not to place transducers 650–654 too near area of curvature 112. Although an area of curvature 112 does not theoretically affect the long-range transmission of acoustic signals, nonetheless curve 112 creates localized turbulence in the mud stream. This turbulence can interfere with accurate retrieval of acoustic signal 170 from the mud.

Some way of finding c, the speed of sound in mud, is also necessary. The speed of sound in mud can be approximated by formulae, or may be estimated and is about 4,000 ft/sec. However, the exact value of c varies depending upon the composition and viscosity of the drilling fluid. For example, additives can be introduced to the mud to change its viscosity and hence c. Thus, to accurately retrieve the data signal 170, it is preferable to determine the value of c at the drill site. One manner of finding c is by generating an acoustic signal downhole at transmitter 140 during a relatively quiescent period when no drilling is taking place (and thus noise is minimal). Some time later, this signal is received at transducers 650–654. If the distance between the transmitter 140 and the transducers 650–654 is known, and the time between the generation and reception of the acoustic signal is also known, the speed of sound in mud may be found from the following equation:

$$c = \text{distance between transmitter and transduce array} / \text{time between signal generation and reception} \quad (9)$$

where c is the speed of sound in mud.

Another manner of finding c is to generate an acoustic signal uphole, such as by mud pump 120. This signal will travel down hole and reflect off the end of the drill string, causing an echo. Upon detection of this echo at transducer 150, the total travel time T of the acoustic wave may be established. If the length L of the drill string is also known, c may be easily determined from c=2L/T.

As stated above, a minimum of two signal receivers are required; however, the utilization of a greater number is preferred. The use of more than two transmitters not only creates a redundancy useful for error correction, but also allows the use of a range of acoustic transmission frequencies. This is helpful because different acoustic frequencies may be preferred under different conditions. For example, where the drill string is long (e.g., greater than one mile), low frequency acoustic signals are preferred because over distance high frequency signals attenuate and die out. A shorter drill string implies less amplitude attenuation; thus, a faster data transmission rate using faster frequencies is possible. As such, an interpretive processor should be able to choose various measurements at different transducers depending on the frequency of the acoustic signal.

An MWD system built in accord with the teachings of the present invention may have five transducers 650–654, with each of these transducers being spaced from one another at 3% of a low-frequency wave length. At a higher frequency, each transducer may be spaced from its neighbor by 10% of a wave length. As such, at the low frequency signal, a processor may be programmed to select the measurements from transducers 650, 652, and 654, these transducers each being spaced apart from each other by 6% of a wavelength. Of course, transducers 651 and 653 may also be used for error checking and redundancy purposes. In any case, upon switching to a higher frequency signal, transducers 650 and 651, spaced apart by 10% of a wavelength, may be an ideal set of transducers. Once again, other transducers 652–654 could be used for error checking and redundancy purposes. As can be seen, this arrangement provides the flexibility to alter the acoustic downhole transmission rate while maintaining the noise and reflected signal filtration advantages of the present invention.

One drawback of the arrangement as shown in FIG. 6 is the drilling of many taps in the stand pipe or drill string. A series of many taps in the stand pipe is presently unfeasible because each tap weakens the piping of the stand pipe and can lead to cracks and damage. As such, a method for reducing the number of taps is preferred.

Figure 4:
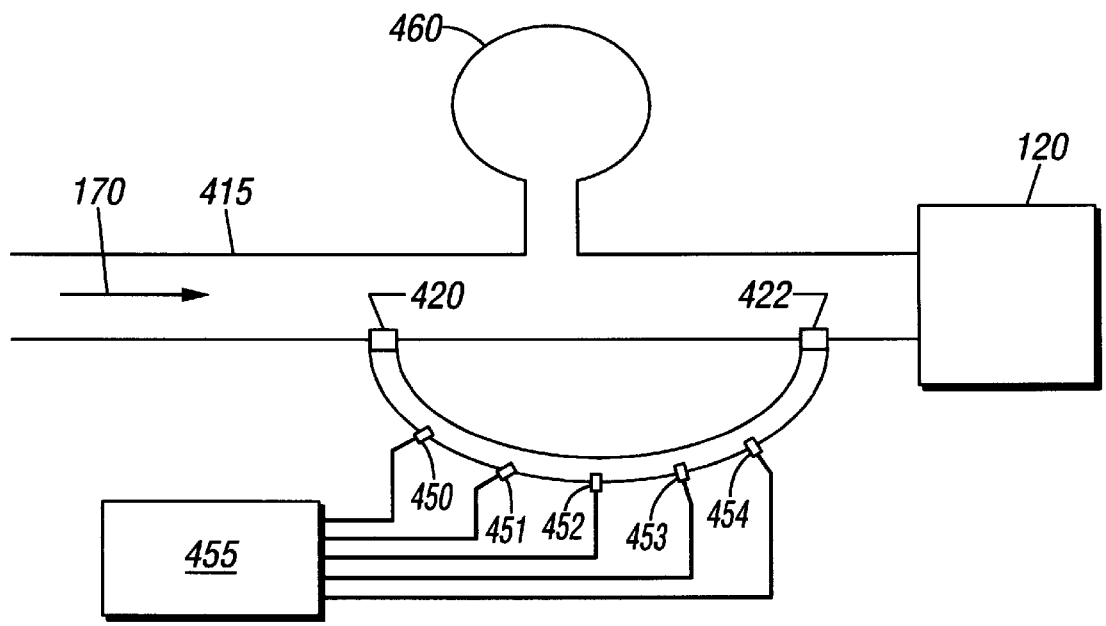
FIG. 4 shows a first embodiment of the present invention.

Referring to FIG. 4, suspended between taps 420, 422 is a bypass loop, or hydraulic hose, which fills with mud upon the pumping of mud into the stand pipe. As such, the mud contained in this hydraulic hose also carries acoustic signals, as each acoustic signal bifurcates between the stand pipe and the hydraulic hose. Located within this hose are multiple pressure transducers 450, 451, 452, 453, and 454. Each of these pressure transducers 450–454 connects to a signal processor 455. Such a configuration allows only two holes or taps to be drilled in the stand pipe 415, and yet allows the desired number and spacing of the pressure transducers 450–454. A bypass loop is generally disclosed in U.S. Pat. No. 5,515,336 to Wilson Chin et al., the teachings of which are hereby incorporated by reference.

Figure 5:
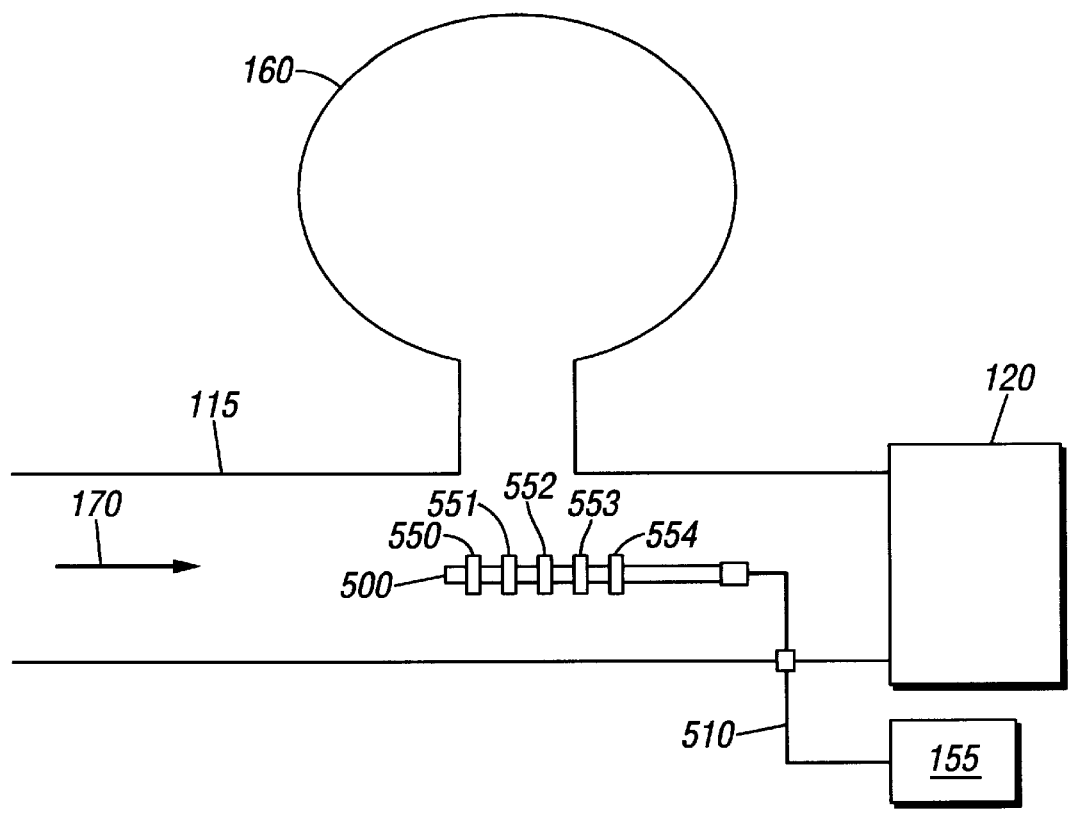
FIG. 5 shows a second embodiment of the present invention.

An alternate embodiment for accommodating multiple stand pipe transducers is shown in FIG. 5. FIG. 5 shows a stand pipe 115, mud pump 120, desurger 160, signal processor 155, MWD signal 170, and an unreeling coil 500 mounted within stand pipe 115. Upon unreeling coil 500 are mounted multiple transducers 550, 551, 552, 553, 554. The unreeling coil opens upon the pumping of mud and aligns itself with the (right to left) flow of the drilling fluid. A single multi-wire cable 510 runs from the unreeling coil to the tap in the stand pipe. The multi-wire cable then runs from the tap in the stand-pipe to a surface signal processor 155, which inputs the signals from the series of transducers 550–554 mounted along the unreeled coil, and determines the optimum transducers and measurement timing to be used for a particular frequency and field job. As can be seen, the configuration shown in FIG. 5 advantageously requires only a single hole or tap drilled into the stand pipe.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. For example, instead of using the mud as an acoustic wave transmission medium, the metallic piping of the drill string may be used. In addition, nothing in the equations requires that this approach be used exclusively with LWD systems. Other applications using a modulated signal, multiple receivers, and multiple measurements are also appropriate. Accordingly, the scope of protection is not limited to the embodiments described herein, but is only limited by the claims which follow, the scope of which shall include all equivalents of the subject matter of the claims.

What is claimed is:

1. A signal processor for use with a plurality of signal receivers, at least one of said plurality of signal receivers being spaced from another of said plurality of signal receivers by a distance less than one-quarter wavelength of a first frequency, each signal receiver being capable of a plurality of measurements, said signal processor comprising:

an input terminal for receiving measurements from said plurality of signal receivers, wherein each of said measurements is the sum of a first waveform travelling in a first direction at said first frequency and a second waveform travelling in a second direction, said first direction and said second direction being opposite;

a controller for selecting certain of said plurality of signal receivers spaced by said distance less than one-quarter wavelength of said first frequency and certain of said plurality of measurements corresponding to each signal receiver, wherein said controller filters one of said first and second waveforms from said measurements, and retrieves the other of said first and second waveforms.

2. The signal processor of claim 1, wherein said controller is a means for retrieving said first waveform.

3. The signal processor of claim 1, wherein said plurality of measurements are taken at time intervals corresponding to less than a quarter wave period.

4. The signal processor of claim 1, wherein said controller retrieves the other of said first and second waveforms according to the equation:

$$g' = \frac{cp_x - p_t}{2c}.$$

5. The signal processor of claim 1, wherein said controller retrieves the other of said first and second waveforms according to the equation:

$$f' = \frac{cp_x + p_t}{2c}.$$

6. The signal processor of claim 1 wherein said distance is from five to fifteen percent of a wavelength at said first frequency.

7. The signal processor of claim 6, wherein said plurality of measurements axe taken at time intervals corresponding to five to fifteen percent of a wave period.

8. A signal processing system for separating a transmission medium's upcoming and downgoing signals and for use in a borehole, comprising:

a drillstring positioned in said borehole, said drill string including a peripheral housing and a hollow center suitable for carrying fluid;

a transmitter associated with said drill string, said transmitter capable of generating a data signal at a first frequency;

a transmission medium for carrying said data signal, said transmitter in contact with said transmission medium;

a plurality of signal receivers associated with said transmission medium, said plurality of signal receivers suitable for receiving said data signal and at least two of said plurality of signal receivers spaced from each other at a distance of less than one-quarter wave length of said first frequency; and a signal processor connected to said plurality of signal receivers, said signal processor receiving at least two measurements taken at said plurality of signal receivers, wherein there exists a period of time between said at least two measurements, and wherein said period of time between said at least two measurements is less than one-quarter wave period at said first frequency.

9. The signal processing system of claim 8, wherein said time period is from five to fifteen percent of said wave period of said first frequency.

10. The signal processing system of claim 8, wherein said transmission medium is drilling fluid and said data signal is acoustic.

11. The signal processing system of claim 8, wherein said transmission medium is the peripheral housing of said drill string.

12. The signal processing system of claim 8, wherein said signal receivers are transducers.

13. The signal processing system of claim 8, wherein said signal processor is programmed to retrieve said downgoing signal.

14. The signal processing system of claim 8, wherein said data signal is a modulated signal.

15. The signal processing system of claim 8, wherein said plurality of signal receivers are contained in a bypass loop attached to said drill string.

16. The signal processing system of claim 8, further comprising a stand pipe attached to said drill string, said plurality of signal receivers being arranged along an unreeling coil inside of said stand pipe.

17. The signal processing system of claim 8, wherein said signal processor retrieves said upcoming signal from said transmission medium and filters out said downgoing signal.

18. The signal processing system of claim 17, wherein said signal processor retrieves said upcoming signal according to the following relationship:

$$g' = \frac{cp_x - p_t}{2c}.$$

19. The signal processing system of claim 8, wherein said distance is from five to fifteen percent of said wave length of said first frequency.

20. The signal processing system of claim 19, wherein said time period is from five to fifteen percent of said wave period of said first frequency.

21. The signal processing system of claim 20, wherein said plurality of signal receivers is at least three signal receivers.

22. A method for processing signals that are a combination of a forward traveling wave and a backward traveling wave, comprising:
(a) providing a transmitter;
(b) providing a signal source;
(c) providing a transmission path connected between said transmitter and said signal source, said transmission path having a forward direction and a backward direction;
(d) generating at said transmitter a forward travelling, encoded signal a selected frequency;
(e) generating at said signal source a backward travelling signal;
(f) selectively arranging multiple signal receivers along said transmission path, each of said multiple signal receivers being suitable for receiving said forward and said backward travelling signals, at least two of said multiple signal receivers being spaced from each other at a selected interval less than a quarter wave length of said selected frequency;
(g) taking multiple measurements from said at least two of said multiple signal receivers, said multiple measurements being spaced apart by less than a quarter wave period; and
(h) filtering said forward traveling wave from said backward traveling wave based upon said multiple measurements.

23. The method of claim 22, wherein each of said signal receivers is spaced from a neighboring signal receiver by said selected interval less than a quarter wavelength of said selected frequency.

24. The method of claim 22, wherein said transmitter is an acoustic transmitter and said signal receivers are transducers.

25. The method of claim 24, wherein said signal source is a reflector of said forward traveling, encoded signal.

26. The method of claim 24, wherein said signal source generates noise.

27. A method for processing a received wave form, comprising:
a) providing a transmission medium;
b) applying a data signal to said transmission medium, said data signal having a wave form and being modulated to include data;
c) a step for selectively positioning a plurality of signal receivers by a distance less than one-quarter wavelength of a first frequency, said signal receivers being capable of detecting said data signal;
d) a step for selectively timing measurements of said plurality of signal receivers; and
e) a step for processing said measurements to approximate the wave form of said data signal to retrieve said data included in said data signal.

* * * * *